(12) United States Patent
Xiong et al.

(10) Patent No.: US 10,003,501 B1
(45) Date of Patent: Jun. 19, 2018

(54) SELF-IDENTIFYING CABLE ASSIGNMENT

(71) Applicant: EMC IP Holding Company LLC, Hopkinton, MA (US)

(72) Inventors: Joan Xiong, Shanghai (CN); Jia Xin, Shanghai (CN); Xi Chen, Shanghai (CN); Donald Mace, Hopkinton, MA (US); Xiaoye Jiang, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 14/975,317

(22) Filed: Dec. 18, 2015

(51) Int. Cl.
  G06F 15/173 (2006.01)
  H04L 12/24 (2006.01)
(52) U.S. Cl.
  CPC .................. *H04L 41/12* (2013.01)
(58) Field of Classification Search
  None
  See application file for complete search history.

(56) References Cited

U.S. PATENT DOCUMENTS

| 2016/0014073 A1* | 1/2016 | Reddy | H04L 67/38 |
| | | | 713/2 |
| 2017/0149880 A1* | 5/2017 | Lochhead | H04L 67/1031 |
| 2017/0149931 A1* | 5/2017 | Lochhead | H04L 67/327 |

* cited by examiner

*Primary Examiner* — Brian Whipple
(74) *Attorney, Agent, or Firm* — Van Pelt, Yi & James LLP

(57) ABSTRACT

A plurality of network cables are physically connected to a plurality of network ports on an appliance, wherein the appliance comprises a plurality of nodes each associated with a corresponding chassis slot position in which the node is located within a chassis of the appliance and each node having at least one management network port and one host network port. A network address is identified for each of the plurality of network ports. A first subset of network addresses is identified as being associated with a management network port and a second subset of network addresses is identified as being associated with a host network port based at least in part on a respective response received from each network address to a management request using a management interface protocol. For each management network port, a corresponding chassis slot position is associated with that management network port based at least in part on a response to a slot request using the management interface protocol. For each host network port, a corresponding chassis slot position is associated with that host network port based at least in part on a response to an identification request using the management interface protocol.

20 Claims, 4 Drawing Sheets

SELF-IDENTIFYING CABLE ASSIGNMENT

BACKGROUND OF THE INVENTION

In the production and assembly of multi-node computer systems there is a step usually taken in the production factory to initialize and configure each node of the system. This step is usually done via network connections for efficiency. Care must be taken to connect the correct network connection to the expected network port for a node. If an operator error is made with an incorrect network connection to a node, it increases downtime and reduces efficiency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Self-identifying cable assignment is disclosed. An example embodiment is given for a particular multi-node system termed an "appliance", but any person having ordinary skill in the art will understand the technique disclosed may be applied without limitation to any multi-node computer system.

In one embodiment, an appliance is a four node unit that may fit in a typical computer server rack. In one embodiment, the appliance is 2 U high.

One manufacturing step for an appliance includes connection of multiple network cables to the virgin appliance to configure nodes within the appliance and install software on each of the nodes. Traditionally, a skilled operator may pre-identify which network cable goes to which port, but an operator error will slow down the manufacturing process.

Plugging network cables in without pre-identification and identifying specific mapping of switch to appliance ports via programmatic inspection is disclosed. Programmatic inspection reduces the chance of operator error and manufacturing time.

Figure 1:
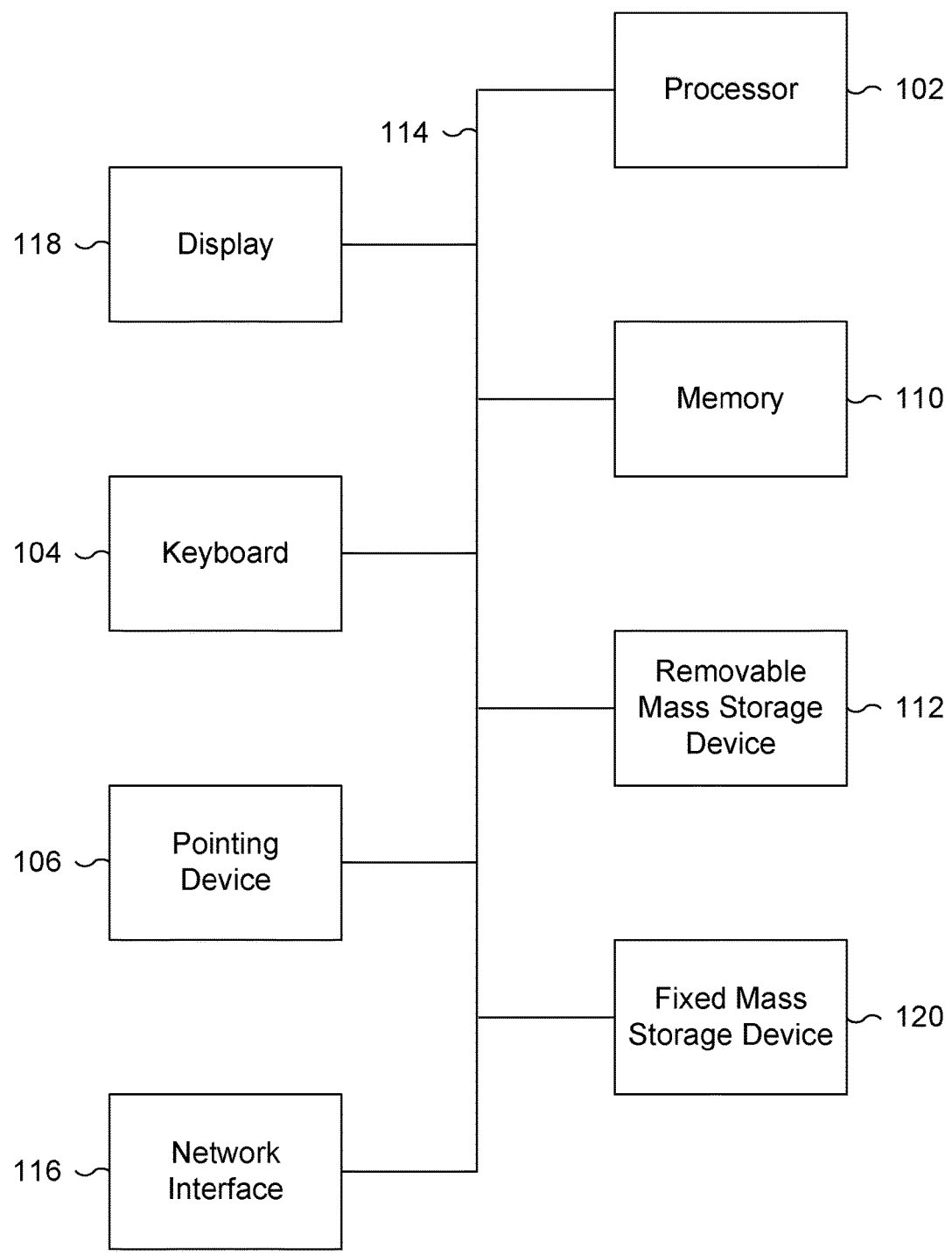
FIG. 1 is a functional diagram illustrating a programmed computer system in accordance with some embodiments.

FIG. 1 is a functional diagram illustrating a programmed computer system in accordance with some embodiments. As shown, FIG. 1 provides a functional diagram of a general purpose computer system as may represent a node of the appliance and/or a management server programmed to programmatically inspect/identify said node and/or port type of an appliance with some embodiments. As will be apparent, other computer system architectures and configurations can be used to perform such a programmatic inspection/identification. Computer system (100), which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system (100). Using instructions retrieved from memory (110), the processor (102) controls the reception and manipulation of input data, and the output and display of data on output devices, for example display (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) can also include computer-readable media such as magnetic tape, flash memory, PC-CARDS, portable mass storage devices, holographic storage devices, and other storage devices. A fixed mass storage (120) can also, for example, provide additional data storage capacity. The most common example of mass storage (120) is a hard-disk drive. Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a network interface (116), a keyboard (104), and a pointing device (106), as well as an auxiliary input/output device interface, a sound card, speakers, and other subsystems as needed. For example, the pointing device (106) can be a mouse, stylus, track ball, or tablet, and is useful for interacting with a graphical user interface.

The network interface (116) allows processor (102) to be coupled to another computer, computer network, or telecommunications network using a network connection as shown. For example, through the network interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system (100) to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, IPMI, Serial ATA, 1-Wire, UNI/O, or any form of connecting homogenous, heterogeneous systems and/or groups of systems together. Additional mass storage devices, not shown, can also be connected to processor (102) through network interface (116).

An auxiliary I/O device interface, not shown, can be used in conjunction with computer system (100). The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC" s), programmable logic devices ("PLD" s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems can also be utilized.

Figure 2:
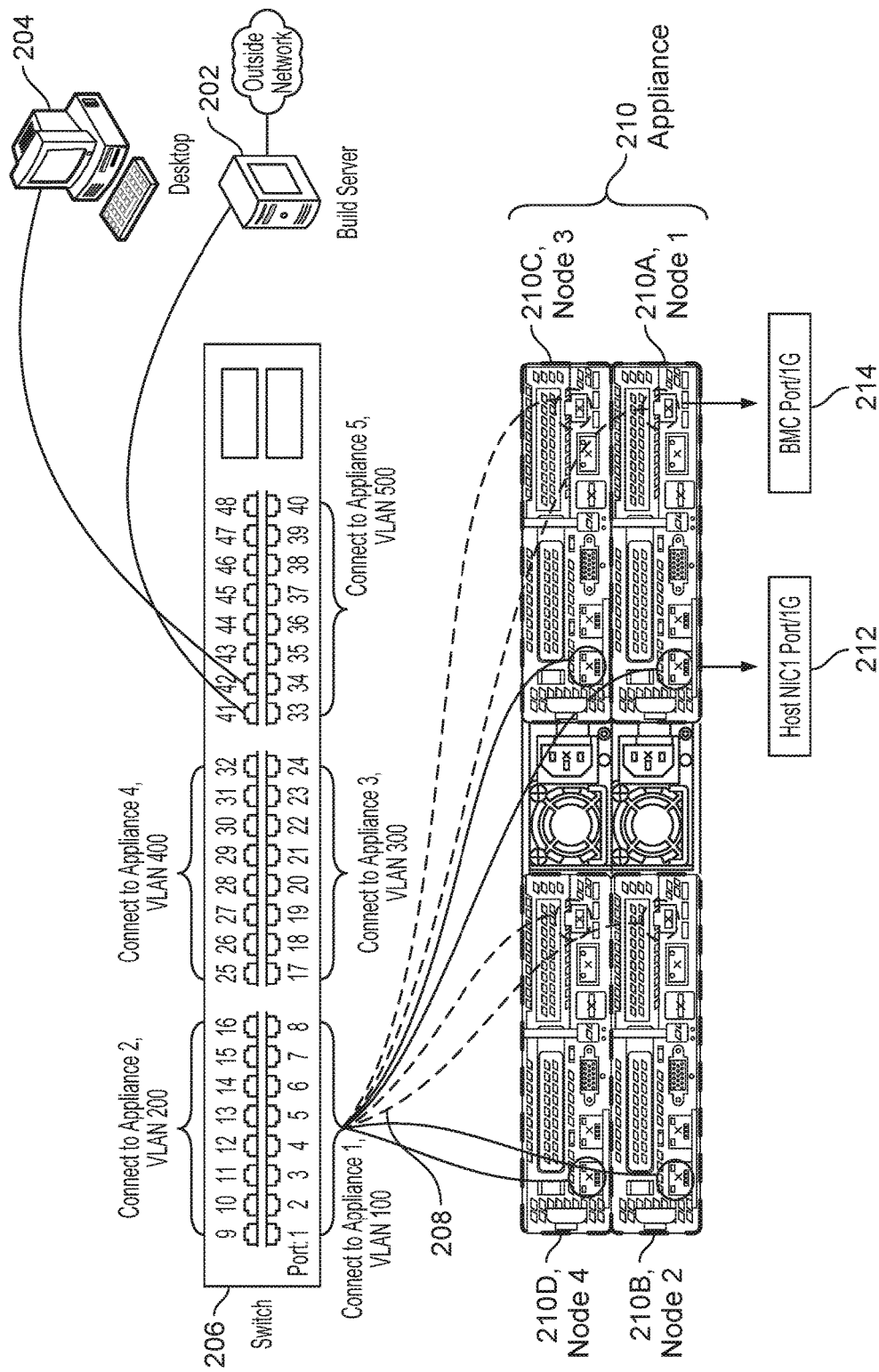
FIG. 2 is an illustration of a network topology during appliance manufacturing.

FIG. 2 is an illustration of a network topology during appliance manufacturing. Manufacturing server (202) and/or operator desktop (204) is coupled to a multi-port network switch (206). Throughout this specification, without limitation actions will reference the manufacturing server (202), and any person having ordinary skill in the art will understand the operator desktop (204) gives an interface to manufacturing server (202) and may in some cases may share the workload and/or command requests between desktop (204) and server (202).

In one embodiment, the multi-port network switch (206) is virtually partitioned into a plurality of subnets and/or VLAN (virtual local area networks) group on a pre-defined port number basis. For example, for a four-node appliance with eight ports per appliance for programmatic inspection/identification, on switch (206):

Ports 1-8 are associated with VLAN100 for a first appliance;
Ports 9-16 are associated with VLAN200 for a second appliance;
Ports 17-24 are associated with VLAN300 for a third appliance;
Ports 25-32 are associated with VLAN400 for a fourth appliance;
Ports 33-40 are associated with VLAN500 for a fifth appliance; and
So forth, with a remainder of ports for manufacturing server 202 and/or operator desktop (204).

The manufacturing operator is thus presented with an 'umbilical cord' (208) of a plurality of network cables and optionally one or more power cables for each of the VLANs, wherein the power cables are not shown in FIG. 2. As will be shown, these umbilical cords may be physically or logically tied together in bundles carefully once and reused for each appliance being manufactured without risk of operator error. For the example given above, an umbilical cord includes eight network cables and two power cables for a four-node appliance. In one embodiment and without limitation, the switch (206) is a gigabit Ethernet and each network cable in the umbilical cord is a gigabit Ethernet cable.

The umbilical cord (208) is physically connected to a raw appliance (210). In one embodiment, the appliance comprises four nodes (210A, 210B, 210C, 210D), wherein each node is associated with a corresponding "chassis slot"

position in which the node is located within a chassis of the appliance. In the example above, 210A is slot position one, 210B is slot position two, 210C is slot position three, 210D is slot position four, and so the node in slot position one (210A) is called "node one", and so forth. In one embodiment, each node on an appliance may have a plurality of 1 GB host network ports, a plurality of 10 GB host network ports, and one or more BMC (baseboard management controller) and/or RMM (remote management) ports. Without regard to which of the cables is connected to which port, an operator only needs to ensure that a network cable from umbilical cord 208 is physically connected to each node's BMC network port (212) and one of each node's 1 GB host port (214).

Again, the switch (206) where the cables are ultimately connected to the manufacturing device are identified by the device with specific number assignments, for example 1 thru 8. Of these specific ports it does not matter which BMC port (212), or 1 GB host port (214), or which node (for example, node slot 1 through node slot 4) in the raw appliance that the cables within the umbilical cord (206) are plugged into initially. However, the mapping and identification of each of the target ports in the raw appliance (210) is critical for the eventual manufacture of the appliance and preparation of the appliance for customer delivery.

Thus, to simplify mapping ports from the network switch (206), to ports on the appliance (210) an programmatic inspection/identification mechanism is disclosed that automatically cycles through all ports in the switch (206) and through a series of network commands determines which type of port (212, 214) and which specific node and slot position (210A, 210B, 210C, 210D) they are plugged into in the appliance.

Figure 3:
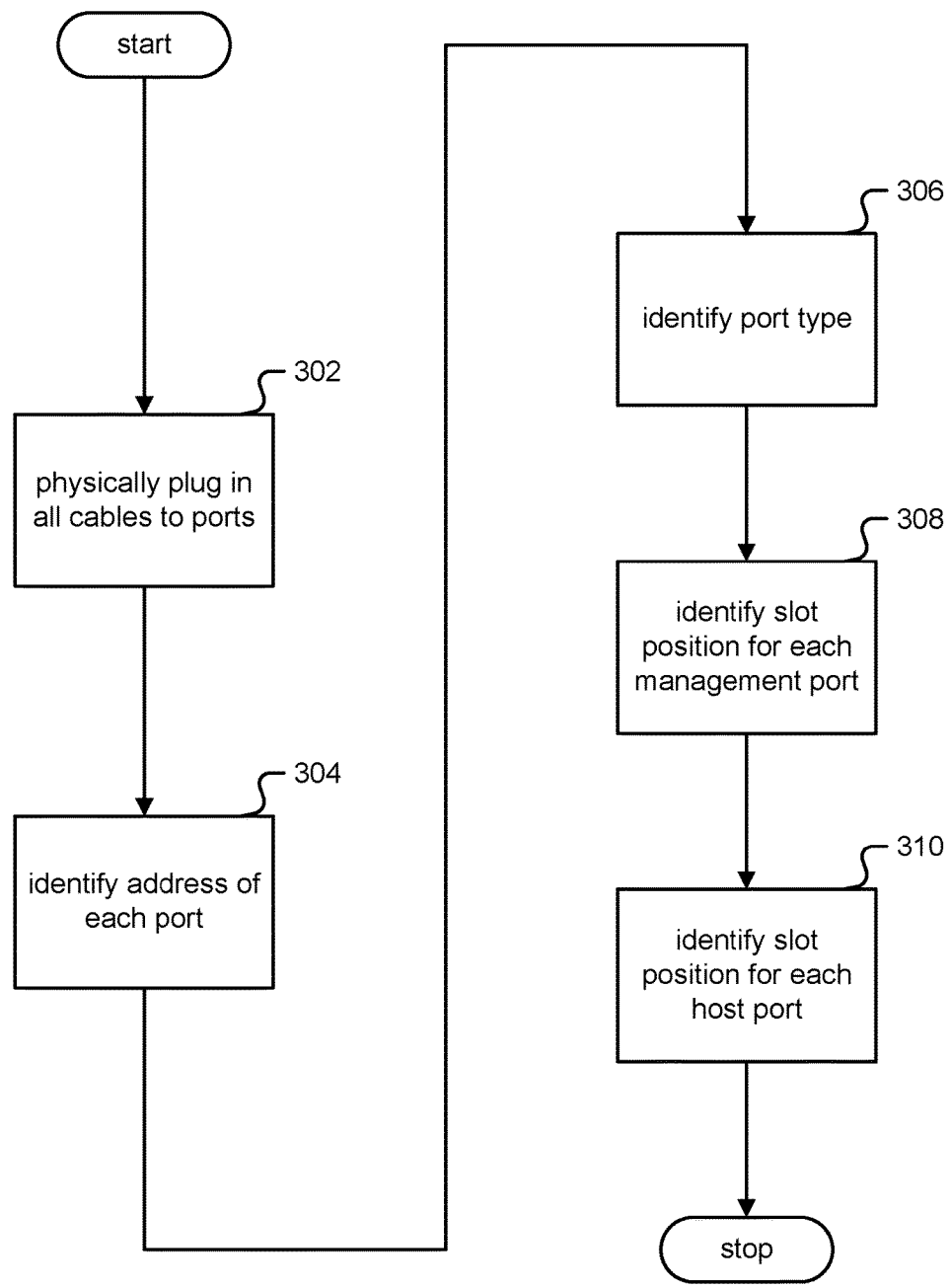
FIG. 3 is a block diagram illustrating an embodiment of a process for programmatic inspection and/or identification.

FIG. 3 is a block diagram illustrating an embodiment of a process for programmatic inspection and/or identification. In one embodiment, the process of FIG. 3 is carried out on the network topology of FIG. 2.

In step (302), a plurality of network cables (208) are physically connected to a plurality of network ports of an appliance (210), the appliance (210) comprising a plurality of modules each associated with a corresponding chassis slot position (210A, 210B, 210C, 210D) in which the module is located within a chassis of the appliance (210) and each module having at least one management network port (212) and one host network port (214). For example the umbilical cord (208) is connected to appliance (210).

In step (304), a network address is identified for each of the plurality of network ports physically connected to the plurality of network cables (208). In one embodiment, a DHCP server on the management server (202) is used for the associated subnet/VLAN to identify/determine a network address, for example using DHCP discovery and/or requests.

In the example of a four-node appliance (210) with each node having a management network port (212) and host network port (214), the result is eight IP network addresses for each of the network ports. As a specific example, as a result eight network addresses are found:
192.168.2.1
192.168.2.2
192.168.2.3
192.168.2.4
192.168.2.5
192.168.2.6
192.168.2.7
192.168.2.8

In step (306), a port type is identified for each of the of the plurality of network ports physically connected to the plurality of network cables (208), based at least in part on a respective response received from each network address to a management request using a management interface protocol.

Throughout this specification a management interface protocol refers without limitation to any protocol for managing computer network devices, including IPMI (Intelligent Platform Management Interface), MCTP, SNMP and/or Intel AMT. Other examples of supported protocols include HP iLO, Dell DRAC, Oracle ILOM and/or IBM ASMA/RSA/IMM.

In one embodiment, IPMI is used without limitation, for example with the open source utility IPMItool on the management server (202). In one embodiment, as a management request the management server (202) sends an IPMI common command for a UUID address to all network addresses (208). Because a management network port (212) is not the same as a host network port (214), only the management network port (212) will be configured to respond with the UUID and/or BMC address. The management server (202) can then associate each of the (four) network addresses with a response as a "management network port". The remaining (four) network addresses that did not respond are categorized as a "host network port". To continue the specific example, at the end of step (306) it is identified:
192.168.2.1: Management network port
192.168.2.2: Management network port
192.168.2.3: (Host network port)
192.168.2.4: (Host network port)
192.168.2.5: Management network port
192.168.2.6: (Host network port)
192.168.2.7: Management network port
192.168.2.8: (Host network port)

In step (308), a corresponding chassis slot position is associated with a management network port based at least in part on a response to a slot request using the management interface protocol.

In one embodiment, as a slot request the management server (202) sends an IPMI command for a slot position and/or number to all (four) network addresses categorized as a management network port in step 306. This IPMI command may be vendor specific to the type of node used in the appliance (202), or a common IPMI sensor read command if the vendor exports it out To continue the specific example, at the end of step (308) it is identified:
192.168.2.1: Management network port Slot 1
192.168.2.2: Management network port Slot 4
192.168.2.3: Host network port
192.168.2.4: Host network port
192.168.2.5: Management network port Slot 2
192.168.2.6: Host network port
192.168.2.7: Management network port Slot 3
192.168.2.8: Host network port In step (310), a corresponding chassis slot position is associated with a host network port based at least in part on a response to an identification request using the management interface protocol.

In one embodiment, as an identification request the management server (202) automatically runs commands on a node via the host network port (214), for example using SSH (secure shell) or other remote protocol, without limitation. After the SSH connection has been made to the host network port (214), a operating system command and/or a management interface tool such as IPMItool can be installed and/or run on the node to create an in-band connection to the associated management network port (212) for the node.

Throughout this specification an "in-band" connection refers without limitation to a connection made within a node, for example using an internal bus on the node such as PCI, PCIe, and/or USB. In one embodiment, the UUID of the node can be dumped out from the host's OS (operating system).

In one embodiment, once connected though the in-band connection, the identification request can include a query to the network address of the associated management network port (212), for example using the IPMItool "LAN print" command. So for the above example, if the management server (202) SSHs to 192.168.2.6 and the in-band LAN print result states 192.168.2.2 which is a management network port for Slot 4, then 192.168.2.6 is identified as a host network port for Slot 4.

In another embodiment, once connected through SSH, host UUID can fetched through various functions provided by the host OS. In the same example, if the management server (202) SSHs to 192.168.2.6 and for example the node is UNIX the command "cat /sys/class/dmi/id/product_uuid" will output the UUID. This UUID may then be compared with the output of the previous IPMItool UUID command output from Step 306. For the same slot, the UUID from the host OS should be the same as ipmitool UUID command via its BMC IP address. The host IP address may then be mapped to the correct Slot.

The rest of the specific example identifies:
192.168.2.1: Management network port Slot 1
192.168.2.2: Management network port Slot 4
192.168.2.3: Host network port Slot 3
192.168.2.4: Host network port Slot 1
192.168.2.5: Management network port Slot 2
192.168.2.6: Host network port Slot 4
192.168.2.7: Management network port Slot 3
192.168.2.8: Host network port Slot 2

Figure 4:
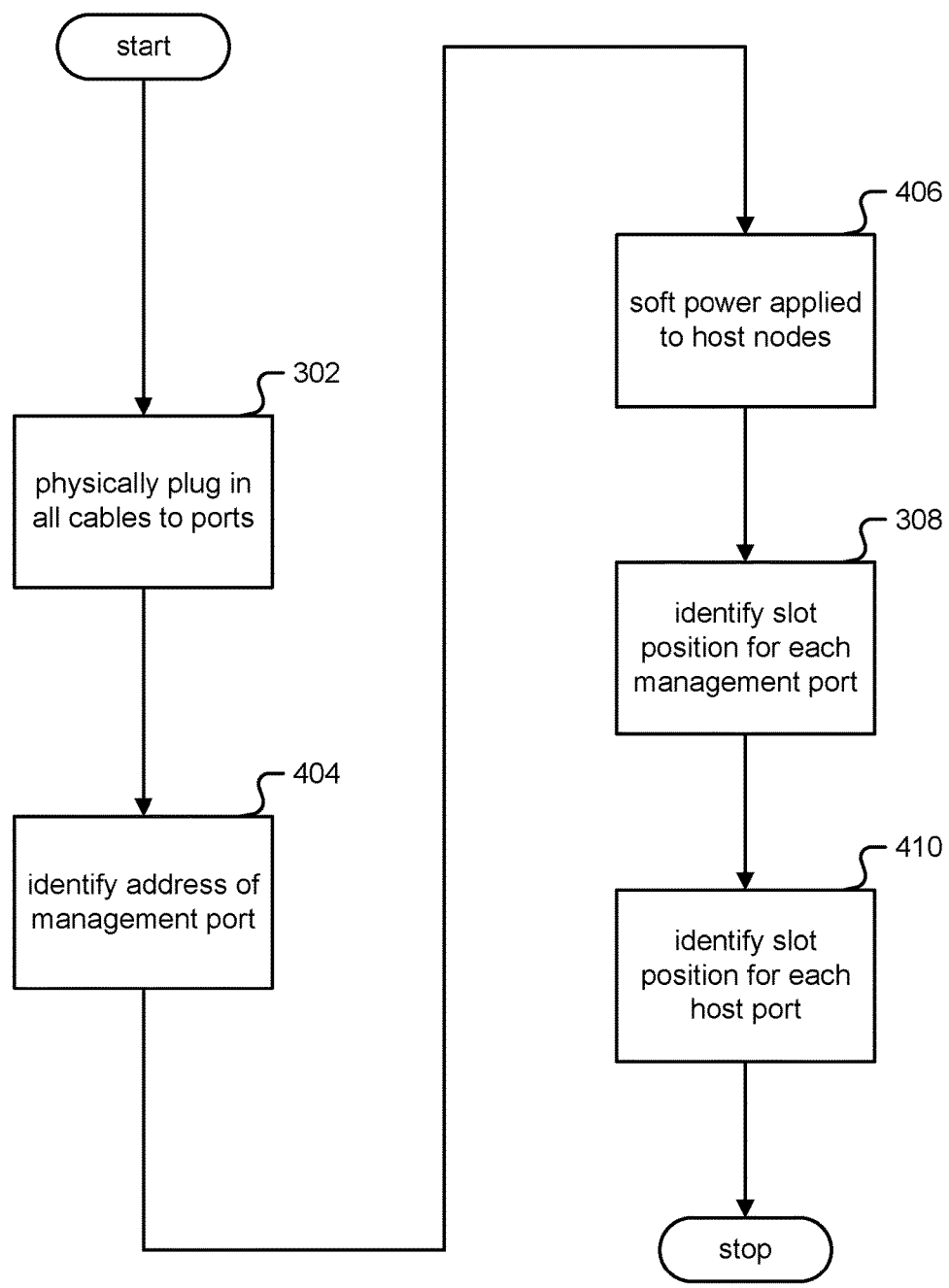
FIG. 4 is a block diagram illustrating an alternate embodiment of a process for programmatic inspection and/or identification.

FIG. 4 is a block diagram illustrating an alternate embodiment of a process for programmatic inspection and/or identification. One example is if the host is not configured in a "power on after AC power restore" mode. In one embodiment, the process of FIG. 4 is carried out on the network topology of FIG. 2 as an alternate to the process of FIG. 3.

As shown in FIG. 4, the steps (302) and (308) are similar to that of FIG. 3. In one embodiment, there will be an extra step to power on one or more nodes (210A-210D) of an appliance (210) through an IPMI interface via the umbilical cord (208).

On a factory/manufacturing floor, electrical power can cause damage if systems are not powered in the correct order or if power is applied in a rushed manner. In one embodiment, a node and/or appliance can have power cords physically connected to it without powering up the node. In one embodiment, the BMC port uses power from a power cord physically connected to it to perform some functions even if the node is not powered up. In one embodiment, a node can be switched on with a host power-on command from the BMC port. Throughout this specification, without limitation, a "host power-on" refers to any powering up of a node/computer system when power is already available to the respective node/system's power supply, but the node/computer system is not powered up. In these embodiments the BMC port may be identified and power may be controlled in an alternate manner from FIG. 3.

Thus, in step (404) without powering the appliance, management ports may still participate in a network address discovery, and in doing so the ports may be identified as management network ports (212):

192.168.2.1: Management network port
192.168.2.2: Management network port
192.168.2.3: (Host network port)
192.168.2.4: (Host network port)
192.168.2.5: Management network port
192.168.2.6: (Host network port)
192.168.2.7: Management network port
192.168.2.8: (Host network port)

Then in step (406) each of the management ports may be apply a host power-on to their respective nodes. In one embodiment, power is applied sequentially to allow association of a management network port with a host network port. For example, in the above scenario if 192.168.2.5 applies a host power-on and a 192.168.2.8 network address is discovered, then 192.168.2.5 and 192.168.2.8 are associated with each other:

192.168.2.1: Management network port—A
192.168.2.2: Management network port—B
192.168.2.3: Host network port—C
192.168.2.4: Host network port—A
192.168.2.5: Management network port—D
192.168.2.6: Host network port—B
192.168.2.7: Management network port—C
192.168.2.8: Host network port—D After slot position is identified in step (308), for example that "192.168.2.1: Management network port—A" is associated with Slot 1, then in step (410) it may be simpler to identify slot position for each host port with the association of step (406):

192.168.2.1: Management network port Slot 1
192.168.2.2: Management network port Slot 4
192.168.2.3: Host network port Slot 3
192.168.2.4: Host network port Slot 1
192.168.2.5: Management network port Slot 2
192.168.2.6: Host network port Slot 4
192.168.2.7: Management network port Slot 3
192.168.2.8: Host network port Slot 2

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
  an appliance, the appliance comprising a plurality of nodes each associated with a corresponding chassis slot position in which the node is located within a chassis of the appliance and each node having at least one management network port and one host network port;
  a plurality of network cables coupled to a management server; and
  the management server, wherein the management server comprises a processor configured to, upon physically connecting the plurality of network cables to a plurality of network ports on the appliance:
  programmatically identify a network address for each of the plurality of network ports;
  sending a management request using a management interface protocol, in part to identify a first subset of identified network addresses as being associated with a management network port and a second subset of identified network addresses as being associated with a host network port;
  interrogating each management network port with a slot request using the management interface protocol, in part to associate a corresponding chassis slot position with that management network port; and interrogating each host network port with an identification request using the management interface protocol, in part to associate a corresponding chassis slot position with that host network port.

2. The system of claim 1, wherein each identification request is an in-band request on an in-band connection.

3. The system of claim 2, wherein the in-band request is made from within an SSH session associated with a particular host network port.

4. The system of claim 1, wherein said management network ports are configured to respond to requests using the management interface protocol and said host network ports are not configured to respond to requests using the management interface protocol.

5. The system of claim 1, wherein identifying the network address for each of the plurality of network ports is based at least in part on a DHCP service request.

6. The system of claim 1, wherein the plurality of network cables belong to one subnet.

7. The system of claim 1, wherein the plurality of network cables belong to one virtual LAN group.

8. The system of claim 1, wherein the management request is for a management address.

9. The system of claim 8, wherein the management address is a UUID address.

10. The system of claim 1, wherein said management network ports are BMC ports.

11. The system of claim 1, wherein the management interface protocol is IPMI.

12. The system of claim 1, wherein the management server uses IPMItool to perform one or more of the following: a management request, a slot request, and an identification request.

13. The system of claim 1, wherein the management server is further configured to use a management interface protocol to host power-on a node.

14. The system of claim 1, wherein the management server is further configured to use a management interface protocol to host power-on a node and associate a corresponding chassis slot position with a host network port based at least in part on the host powering-on of the node.

15. The system of claim 1, wherein associating a corresponding chassis slot position with that host network port is based at least in part on a match between a host output UUID address and a result of a IPMI UUID command via a BMC port.

16. A method comprising:
physically connecting a plurality of network cables to a plurality of network ports on an appliance, wherein the appliance comprises a plurality of nodes each associated with a corresponding chassis slot position in which the node is located within a chassis of the appliance and each node having at least one management network port and one host network port;
programmatically identifying a network address for each of the plurality of network ports;
sending a management request using a management interface protocol, in part to identify a first subset of identified network addresses as being associated with a management network port and a second subset of identified network addresses as being associated with a host network port;
interrogating each management network port with a slot request using the management interface protocol, in part to associate a corresponding chassis slot position with that management network port; and
interrogating each host network port with an identification request using the management interface protocol, in part to associate a corresponding chassis slot position with that host network port.

17. The method as recited in claim 16, wherein each identification request is an in-band request on an in-band connection.

18. The method as recited in claim 16, wherein associating a corresponding chassis slot position with that host network port is based at least in part on a match between a host output UUID address and a result of a IPMI UUID command via a BMC port.

19. A computer program product, the computer program product being embodied in a non-transitory computer readable storage medium and comprising computer instructions for:
programmatically identifying a network address for each of a plurality of network ports after physically connecting a plurality of network cables to the plurality of network ports on an appliance, wherein the appliance comprises a plurality of nodes each associated with a corresponding chassis slot position in which the node is located within a chassis of the appliance and each node having at least one management network port and one host network port;
sending a management request using a management interface protocol, in part to identify a first subset of identified network addresses as being associated with a management network port;
interrogating each management network port with a slot request using the management interface protocol, in part to associate a corresponding chassis slot position with that management network port; and
interrogating each host network port with an identification request using the management interface protocol, in part to associate a corresponding chassis slot position with that host network port.

20. The computer program product as recited in claim 19, wherein each identification request is an in-band request on an in-band connection.

* * * * *